United States Patent
Upmanue

(10) Patent No.: US 10,071,738 B2
(45) Date of Patent: Sep. 11, 2018

(54) VEHICLE SYSTEM AND VEHICLE CONTROLLER FOR CONTROLLING VEHICLE

(71) Applicants: DENSO International America, Inc., Southfield, MI (US); DENSO CORPORATION, Kariya, Aichi-pref. (JP)

(72) Inventor: Vikas Upmanue, Farmington Hills, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/430,793

(22) Filed: Feb. 13, 2017

(65) Prior Publication Data

US 2018/0229733 A1    Aug. 16, 2018

(51) Int. Cl.
| | |
|---|---|
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |

(Continued)

(52) U.S. Cl.
CPC ...... *B60W 30/18163* (2013.01); *B60W 10/04* (2013.01); *B60W 10/184* (2013.01); *B60W 10/20* (2013.01); *B60W 50/10* (2013.01); *B60W 50/14* (2013.01); *G05D 1/0238* (2013.01); *G08G 1/167* (2013.01); *B60W 2050/146* (2013.01); *B60W 2420/42* (2013.01); *B60W 2420/52* (2013.01); *B60W 2520/10* (2013.01); *B60W 2540/04* (2013.01); *B60W 2550/10* (2013.01); *B60W 2550/141* (2013.01); *B60W 2550/302* (2013.01); *B60W 2600/00* (2013.01); *G05D 2201/0213* (2013.01)

(58) Field of Classification Search
CPC .......... B60W 30/18163; B60W 10/04; B60W 10/184; B60W 10/20; B60W 50/10; B60W 50/14; B60W 30/00; G05D 1/0238; G05D 1/00; G08G 1/161; G08G 1/167; G62D 15/0255
USPC ..................................... 701/41, 23
See application file for complete search history.

(56) References Cited

U.S. PATENT DOCUMENTS

| | | | | |
|---|---|---|---|---|
| 9,475,491 | B1 * | 10/2016 | Nagasaka | B60W 30/16 |
| 2009/0287367 | A1 * | 11/2009 | Salinger | G05D 1/0246 |
| | | | | 701/23 |

(Continued)

*Primary Examiner* — Mahmoud S Ismail

(57) ABSTRACT

A vehicle system includes a driving condition sensor mounted in a subject vehicle, the driving condition sensor detecting a driving condition related to the subject vehicle, a human-machine interface mounted in the subject vehicle, the human-machine interface configured to receive, from a user, a user preference input indicating a lane change parameter corresponding to the driving condition, and a processor coupled to the driving condition sensor and the human-machine interface. The processor is programmed to receive the user preference input from the human-machine interface, determine the driving condition from the driving condition sensor, and determine whether the assisted lane change should be performed based on the driving condition and the lane change parameter.

16 Claims, 3 Drawing Sheets

(51) Int. Cl.
*G06F 7/00* (2006.01)
*G06F 17/00* (2006.01)
*G06F 19/00* (2018.01)
*B60W 30/18* (2012.01)
*B60W 50/14* (2012.01)
*B60W 50/10* (2012.01)
*B60W 10/20* (2006.01)
*B60W 10/184* (2012.01)
*G05D 1/02* (2006.01)
*B60W 10/04* (2006.01)
*G08G 1/16* (2006.01)
*G01C 22/00* (2006.01)

(56) References Cited

U.S. PATENT DOCUMENTS

| | | | | |
|---|---|---|---|---|
| 2013/0338868 A1* | 12/2013 | Essame | ............ | B60W 30/18163 701/23 |
| 2014/0074356 A1* | 3/2014 | Bone | ................ | G08G 1/167 701/41 |
| 2015/0210272 A1* | 7/2015 | Edgren | ................ | G08B 6/00 701/23 |
| 2017/0106871 A1* | 4/2017 | You | ............... | B60W 30/18163 |

* cited by examiner

VEHICLE SYSTEM AND VEHICLE CONTROLLER FOR CONTROLLING VEHICLE

TECHNICAL FIELD

The present disclosure relates to a vehicle system and a vehicle controller for controlling a vehicle.

BACKGROUND

In recent times, assisted driving and automatic driving have emerged as trending technologies. As one example of such technologies, a vehicle controller may perform an assisted lane change or an automatic lane change by controlling the steering system of a vehicle. However, there is a concern that with such technologies, the assisted or automatic lane change may not sufficiently account for the personal preferences of a passenger.

SUMMARY

According to one aspect of the present disclosure, a vehicle system includes a driving condition sensor mounted in a subject vehicle, the driving condition sensor detecting a driving condition related to the subject vehicle, a human-machine interface mounted in the subject vehicle, the human-machine interface configured to receive, from a user, a user preference input indicating a lane change parameter corresponding to the driving condition, and a processor coupled to the driving condition sensor and the human-machine interface. The processor is programmed to receive the user preference input from the human-machine interface, determine the driving condition from the driving condition sensor, and determine whether the assisted lane change should be performed based on the driving condition and the lane change parameter.

According to a second aspect of the present disclosure, a vehicle controller includes a central processing unit coupled to a driving condition sensor and a human-machine interface, the driving condition sensor and the human-machine interface being mounted in a subject vehicle, and a memory coupled to the central processing unit. The central processing unit is programmed to receive, from a user through the human-machine interface, a user preference input indicating a lane change parameter, determine, using the driving condition sensor, a driving condition related to the subject vehicle, the driving condition corresponding to the lane change parameter, and determine whether the assisted lane change should be performed based on the driving condition and the lane change parameter.

Still other objects, advantages, and features of the present disclosure will become apparent after considering the detailed description and drawings.

DETAILED DESCRIPTION

First Embodiment

A first embodiment of the present disclosure will be explained with reference to FIGS. 1 to 4.

Figure 1:
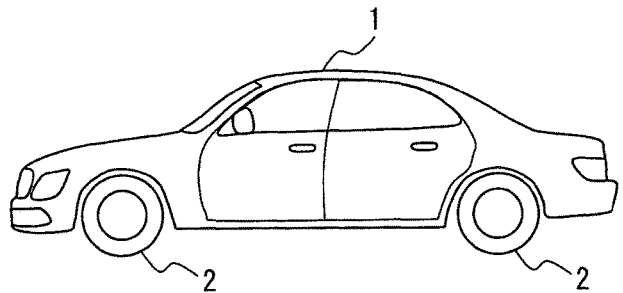
FIG. 1 is an overview of a vehicle.

FIG. 1 shows a subject vehicle 1 including a plurality of wheels 2. While FIG. 1 shows a sedan type passenger vehicle, this is not intended to be limiting. The present disclosure is equally applicable to all types of road vehicles, including trucks, busses, as well as specialized vehicles such as agricultural machinery.

Figure 2:
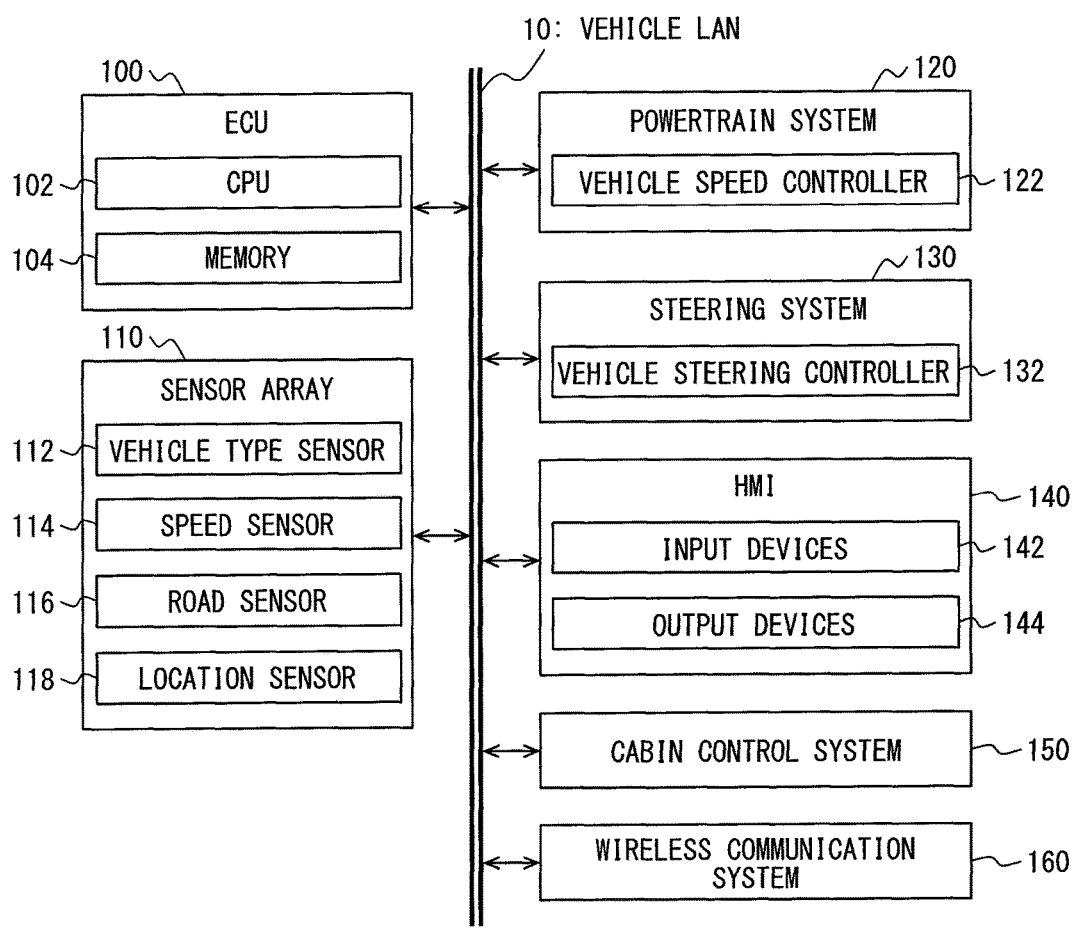
FIG. 2 is a system view of a vehicle LAN.

The subject vehicle 1 includes a variety of on-board systems as shown in FIG. 2. Here, FIG. 2 is a system diagram, in which a vehicle local-area network (LAN) 10 serves as a network bus which interconnects an electronic control unit (ECU) 100, a sensor array 110, a powertrain system 120, a steering system 130, a human-machine interface (HMI) 140, a cabin control system 150, and a wireless communication system 160.

The ECU 100 is a processor which includes a central processing unit (CPU) 102 and a memory 104. The CPU 102 is preferably a microcomputer or microprocessor. The memory 104 is preferably a semiconductor memory such as random access memory (RAM), read only memory (ROM), flash memory, of a combination of these. The memory 104 has stored thereon instructions which program the CPU 102 to perform a variety of tasks as will be described later. In an alternative embodiment, the ECU 100 may be implemented as an off-board remote processor, such as through the use of a remote cloud computing server which communicates with the subject vehicle 1 via the wireless communication system 160. The ECU 100 serves as a vehicle controller which controls the subject vehicle 1. The ECU 100 and the subject vehicle 1 together form a vehicle system that provides lane change assistance as will be described below.

The sensor array 110 is a collection of various sensors, among which includes a vehicle type sensor 112, a speed sensor 114, a road sensor 116, and a location sensor 118. Each of these sensors acts as a driving condition sensor that detect a driving condition related to the vehicle 1, and may be physically mounted in different locations of the subject vehicle 1. In addition, as shown in FIG. 2, the sensor array 110 is coupled to the ECU 100 through the vehicle LAN 10. In an alternative embodiment, the sensor array 110 may be directly connected to the ECU 100.

The powertrain system 120 controls the powertrain of the subject vehicle 1. For example, the powertrain system 120 may control the acceleration, deceleration, and braking of the subject vehicle 1. The powertrain system 120 includes a vehicle speed controller 122 which interfaces with external devices. In the present embodiment, the vehicle speed controller 122 receives command signals from the ECU 100, and controls the speed of the subject vehicle 1 in accordance with those command signals. In FIG. 2, the vehicle speed controller 122 is coupled to the ECU 100 through the vehicle LAN 10. In an alternative embodiment, the vehicle speed controller 122 may be directly connected to the ECU 100.

The steering system 130 controls the steering (i.e., the heading) of the subject vehicle 1 by controlling at least one of the wheels 2 of the subject vehicle 1. The steering system 130 includes a vehicle steering controller 132 which interfaces with external devices. In the present embodiment, the vehicle steering controller 132 receives command signals from the ECU 100, and controls the heading of the subject vehicle 1 in accordance with those command signals. In FIG. 2, the vehicle steering controller 132 is coupled to the ECU 100 through the vehicle LAN 10. In an alternative embodiment, the vehicle steering controller 132 may be directly connected to the ECU 100.

The HMI 140 allows a passenger to input information to the subject vehicle 1, and allows the passenger to receive information about the subject vehicle 1. The HMI 140 includes a plurality of input devices 142 and a plurality of output devices 144. The input devices 142 include, but are not limited to, a keyboard, a keypad, a touch screen, a voice input channel, as well as wired and wireless protocols for receiving user input from another device. For example, the input devices 142 may include a short range wireless transceiver which receives user input from a mobile device operated by the passenger. The output devices 144 include, but are not limited to, a display for visual output, a speaker for audio output, tactile feedback elements (e.g., embedded in a steering wheel or seat), as well as the above mentioned wired and wireless protocols, which may be used to output data to a mobile device operated by a passenger.

The cabin control system 150 controls various miscellaneous aspects of the subject vehicle 1, such as door locking and lighting. The wireless communication system 160 allows the subject vehicle 1 to communicate with other vehicles as well as infrastructure. The wireless communication system 160 may allow communication over a wide variety of protocols such as cellular, short range wireless, and so on.

While the system diagram of FIG. 2 shows each of the ECU 100, the sensor array 110, the powertrain system 120, the steering system 130, the HMI 140, the cabin control system 150, and the wireless communication system 160 as separate systems, this is not intended to limit the physical relationships between these systems. For example, the vehicle type sensor 112 of the sensor array 110 may be physically mounted on the front of the subject vehicle 1, while the location sensor 118 of the sensor array 110 may be physically mounted inside the dashboard of the subject vehicle 1. Similarly, each of the vehicle speed controller 122 and the vehicle steering controller 132 may be implemented as part of the ECU 100. In other words, while FIG. 2 shows a system layout, this does not limit the physical layout of the network. Additionally, while FIG. 2 shows the use of the vehicle LAN 10, this is merely illustrative and not intended to be limiting. Each of the system components may be directly connected to each other instead.

Figure 3:
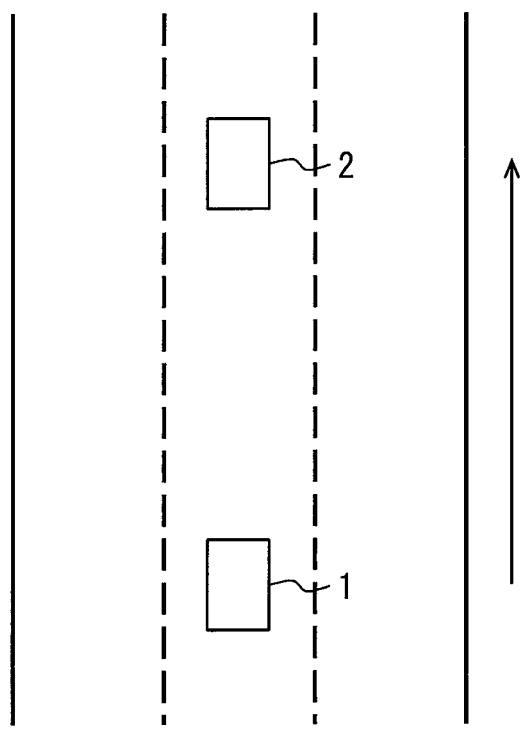
FIG. 3 is a schematic view of a subject vehicle traveling behind a leading vehicle on a straight road.

Next, each of the sensors in the sensor array 110 will be described. The vehicle type sensor 112 detects a vehicle type of a leading vehicle 2 which is ahead of the subject vehicle 1. In this context, as shown in FIG. 3, the leading vehicle 2 refers to a vehicle directly in front of the subject vehicle 1, i.e. in the same lane. In FIG. 3, the direction of travel is upwards, as shown by the arrow.

In the present embodiment, the vehicle type sensor 112 is implemented as an optical camera which optically identifies the vehicle type of the leading vehicle 2. Further, the vehicle type sensor 112 may optionally identify the vehicle type of the leading vehicle 2 through inter-vehicle communications in addition to, or in place of, the optical camera. The vehicle types detected by the vehicle type sensor 112 include categories, such as motorcycle, sedan, small truck, medium truck, large truck, and bus, as well as special vehicles, such as police vehicle, ambulance, and school bus. The vehicle type sensor 112 outputs the identified vehicle type of the leading vehicle 2 to the ECU 100.

The speed sensor 114 detects a speed of the leading vehicle 2. The speed sensor 114 may be implemented as an optical camera that determines the speed of the leading vehicle 2 by visually calculating a relative speed between the leading vehicle 2 and the subject vehicle 1, then adding this relative speed to the current speed of the subject vehicle 1. Alternatively, the speed sensor 114 may be implemented as a radar sensor. Other implementations of the speed sensor 114 are contemplated and considered to be within the gist of the present disclosure. The speed sensor 114 outputs the detected speed of the leading vehicle 2 to the ECU 100.

The road sensor 116 detects a road type of a road on which the subject vehicle 1 is travelling. In the present embodiment, the road sensor 116 is implemented as an optical camera which identifies the physical characteristics of the road, including the number of lanes, the radius of curvature of the lanes, the width of each lane, the presence of a center divide, the presence of a shoulder, the presence of construction, road roughness, and so on. The road sensor 116 outputs the detected road type of the road to the ECU 100.

The location sensor 118 includes a GPS receiver and a memory device that has stored thereon map information. The map information preferably includes road information such as the width of lanes, the shapes of lanes, the speed limit of roads, the presence of construction work, and so on. The location sensor 118 detects a current location of the subject vehicle 1 along with corresponding road information obtained from the map information which describes the current road along which the subject vehicle 1 is travelling. In the present embodiment, the location sensor 118 also outputs the stored road information as a road type of the road to the ECU 100. In other words, the location sensor 118 outputs similar information as the road sensor 116. Accordingly, the location sensor 118 is used in conjunction with the road sensor 11, and may be relied upon if, for example, the road sensor 116 is unable to accurately detect some aspect of the road due to low visibility. In an alternative embodiment, the location sensor 118 may be provided in place of the road sensor 116.

It should be noted that any one or more of the vehicle type sensor 112, the speed sensor 114, and the road sensor 116 may be implemented as the same optical camera, or as separate sensors. In each of these cases, an accommodating image processor and memory may be provided to process the optical data, or the optical data may be directly transmitted to the ECU 100 for processing by the ECU 100 itself.

Figure 4:
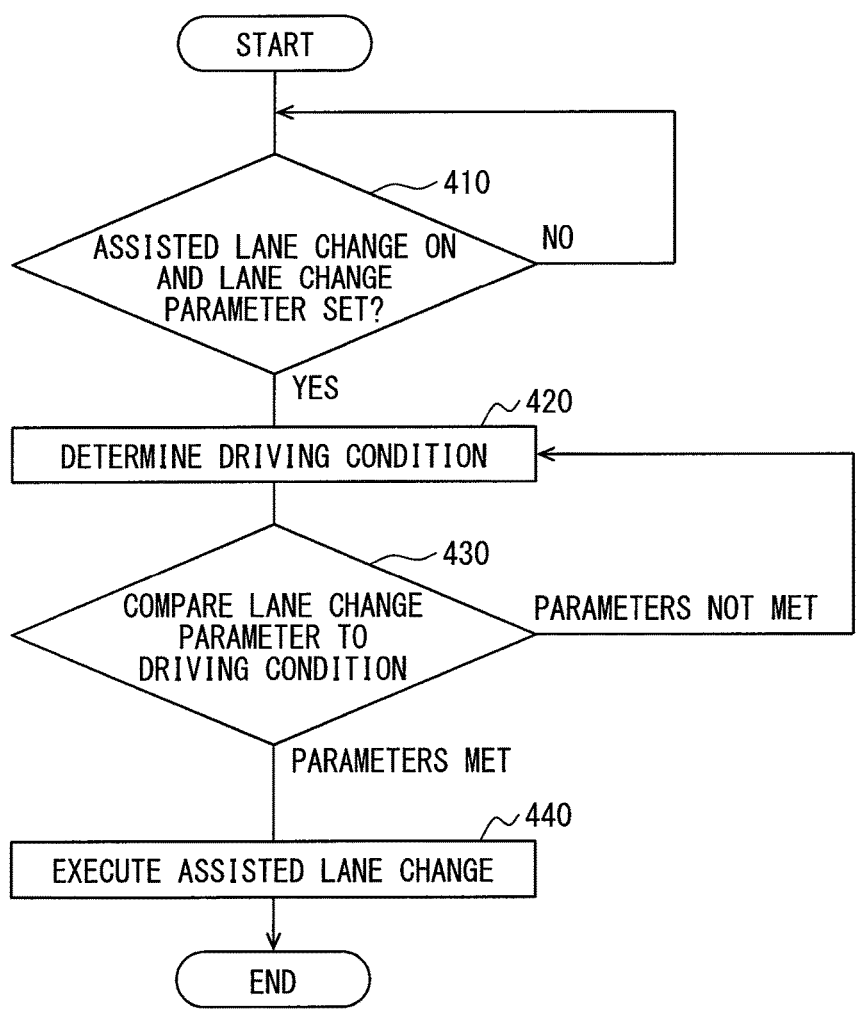
FIG. 4 is a flow chart of an assisted lane change process.

In the present embodiment, the ECU 100 is programmed to perform an assisted lane change control process which accounts for the comfort for the passenger. In particular, lane changes are generally considered to be high risk events relative to other aspects of driving, and as such the number of lane changes may be minimized in view of safety. However, if lane changes are only performed when necessary for navigational purposes, or when a user manually initiates a lane change (e.g., by activating a lane change signal), the comfort and personal preferences of the user may be not be sufficiently considered. For example, a particular user may feel anxious when traveling directly behind a large truck, and an assisted lane change in that case may be appropriate even though the lane change is not necessary for navigational purposes. In view of this, in the present embodiment, the ECU 100 is programmed to perform the assisted lane change control process as shown in FIG. 4.

At step 410, the ECU 100 determines whether assisted lane changes are permitted, and whether lane change parameters are set. Specifically, the passenger inputs this information through the HMI 140, which is coupled to the ECU 100. In the present embodiment, the HMI 140 is configured to receive a first user input (a user enablement input) indicating that assisted lane changes are enabled (i.e., permitted), and a second user input (a user preference input) that defines at least one lane change parameter which, when met, an assisted lane change should be performed. As described below, the at least one lane change parameter includes trigger parameters which are met when matching a driving condition, and includes exception parameters which are met when not matching a driving condition.

Specifically, the first user input is received through one or more of the input devices 142 of the HMI 140, indicating that a passenger would like to enable assisted lane changes. Here, "assisted lane change" refers to a semi-autonomous or fully-autonomous (i.e., automatic) lane change which is both initiated and performed by the vehicle 1. In other words, "assisted lane change" used in the present disclosure is distinguished from lane changes which are manually initiated by a passenger (e.g., through the use of a lane change signal lever) and then performed automatically by the vehicle 1. In addition, in the present embodiment, the assisted lane change is a single lane change away from the current lane that the vehicle 1 is travelling in, i.e., into an adjacent lane.

The first user input may be, for example, a touch button on a touch screen, or a physical switch on a control panel. In an alternative embodiment, the first user input may be received automatically, i.e., default to "on". For example, turning on the ignition of the vehicle 1 may be treated as the first user input. It should be noted that the first user input preferably persists over time to continuously allow assisted lane changes to be performed automatically. In other words, as compared to a situation where a user needs to actuate a turn signal to request each and every assisted lane change, in the present embodiment, the first user input may be received when a user enters the vehicle 2 and persist until the user leaves the vehicle 2.

The second user input is also received through one or more of the input devices 142 of the HMI 140. The second user input includes at least one lane change parameter indicating when the ECU 100 should perform an assisted lane change. In the present embodiment, the second user input may define a vehicle type the leading vehicle 2, a speed of the leading vehicle 2, a road type of the road on which the subject vehicle 1 is travelling, or any combination of these. For example, the second user input may be received through a touch interface of the HMI 140, through which a passenger selects from a list of items. Alternatively, the second user input may be automatically imported into the HMI 140 from an external source, such as a mobile device carried by the passenger.

In the case of vehicle types, the second user input defines at least one vehicle type which triggers an assisted lane change. The vehicle types defined by the user input correspond to those which may be detected by the vehicle type sensor 112. For example, a passenger may feel uncomfortable when driving directly behind a large truck. In this case, the passenger may input, to the HMI 140, a "large truck" vehicle type as the second user input, indicating that an assisted lane change should be performed when the leading vehicle 2 is detected by the vehicle type sensor 112 as a large truck.

Additionally, the second user input may define a list of exception parameters for special vehicles. For example, a passenger may wish to change lanes when travelling directly behind a bus, but set an exception for school busses. In this case, the passenger may input "bus" as a trigger parameter for an assisted lane change, but further input "school bus" as an exception parameter. The passenger may also only define a vehicle type exception parameter. For example, the passenger may input "police vehicle" as a standalone exception, indicating that the assisted lane change should not be performed when traveling behind a police vehicle. This exception parameter will then be used by the ECU 100 to override trigger parameters in other categories, as will be described later.

In the case of vehicle speed, the second user input defines a range of speed which triggers an assisted lane change. The range of speed defined by the second user input corresponds to a range of speed which is detectable by the vehicle speed sensor 114. For example, a passenger may feel frustrated when following a leading vehicle 2 which is travelling at particularly low speeds as compared to the speed limit. In the present embodiment, this range of speed is defined as a difference between the speed limit of the road and the speed of the leading vehicle 2. For example, the passenger may input to the HMI 140 a range of "10 miles per hour or above" as the second user input to indicate that when a leading vehicle 2 is travelling 10 miles per hour below the speed limit (or slower), an assisted lane change should be performed.

Similar to above, the passenger may also define a speed exception parameter which, when matching a driving condition, prohibits assisted lane changes. This is because high speed lane changes may cause anxiety in the passenger. For example, the passenger may input a maximum speed as the second user input, indicating that assisted lane changes should not be performed when the speed of the leading vehicle 2 is above the maximum speed. In other words, the passenger may set a speed exception parameter as part of the second user input.

In the case of road type, the second user input defines at least one road type which triggers an assisted lane change. The road types defined by the second user input correspond to the road types which are detectable by the road sensor 116. For example, a passenger may feel uncomfortable when driving in a lane with a shoulder which is closed due to construction. In this case, the passenger may enter "closed shoulder" to the HMI 140 as the second user input, indicating that when the road sensor 116 or the location sensor 118 detects a closed shoulder, an assisted lane change should be performed.

Similar to above, the passenger may also set road type exception parameters. For example, the passenger may enter "curved road" to the HMI 140 as an exception parameter of the second user input to indicate that when the road sensor 116 or the location sensor 118 detects a curved road, an assisted lane change should not be performed.

At step 410, if the ECU 100 determines that any one of the first user input and the second user input are not set ("NO"), the ECU 100 returns to the beginning of the process and repeats step 410 until both user inputs are set. When the ECU 100 determines that both the first user input and the second user input are set, i.e., that assisted lane changes are permitted and at least one lane change parameter is set ("YES"), the ECU 100 proceeds to step 420.

At step 420, the ECU 100 determines a driving condition from the sensor array 110. In the present embodiment, the ECU 100 determines at least one of a vehicle type from the vehicle type sensor 112, a speed from the speed sensor 114, and a road type from the road sensor 116 and the location sensor 118. Preferably, the ECU 100 determines a driving condition which corresponds to the lane change parameters set by the second user input. For example, if the second user input only defines a vehicle type, then the ECU 100 may determine only a vehicle type of a leading vehicle 2 from the vehicle type sensor 112. Alternatively, the ECU 100 may receive information from each of the sensors in the sensor array 110 regardless of what the second user input defines. After step 420, the ECU 100 proceeds to step 430.

At step 430, the ECU 100 compares the lane change parameters defined by the second user input with the driving conditions to determine whether an assisted lane change should be performed. In the present embodiment, the ECU 100 determines that the lane change parameters are met and an assisted lane change should be performed if any of the trigger parameters defined in the lane change parameters of the second user input matches a driving condition while none of the exception parameters defined in the lane change parameters of the second user input matches a driving condition. In other words, if the passenger has defined any exception parameters as part of the second user input, the exception parameters take priority over the trigger parameters. Accordingly, if at least one exception parameter matches a driving condition, the ECU 100 determines that the lane change parameters are not met regardless of whether any trigger parameters match a driving condition.

At step 430, if the ECU 100 determines that the lane change parameters are not met, the process returns to step 420 and the driving condition detection step is repeated to update the detected driving conditions. If the passenger updates the lane change parameters by inputting the second user input through the HMI 140, the ECU 100 interrupts this loop and returns to step 410 immediately. Conversely, at step 430, if the ECU 100 determines that the lane change parameters are met, the ECU 100 proceeds to step 440 and executes an assisted lane change.

It should be noted that "execute" in this context is only intended to indicate that the ECU 100 allows the assisted lane change to proceed. For example, at step 440, the ECU 100 may simply instruct an external automatic lane changing controller (not illustrated) to perform the assisted lane change. In this case, the external controller will also perform safety checks in-line to ensure that the assisted lane change is performed in a safe manner (including, for example, automatically turning on the appropriate turn signal, waiting for a safe period of time, and checking for traffic). Accordingly, step 440 in the present disclosure is only illustrated in FIG. 4 for completeness, and is not intended to require the ECU 100 itself to perform the assisted lane change. After step 440, the ECU 100 terminates the process and, preferably, reinitiates the process at step 410.

As described above, the ECU 100 of the present disclosure automatically determines whether an assisted lane change should be performed based on a comparison between lane change parameters defined by a passenger and the actual driving conditions. In this regard, the comfort of the passenger is also considered, and a more pleasant driving experience may be provided.

Other Embodiments

The present disclosure is described with reference to the above embodiments, but these embodiments are not intended to be limiting. A variety of modifications which do not depart from the gist of the present disclosure are contemplated.

In the above described embodiments, the ECU 100 automatically executes the assisted lane change upon determining that the lane change parameters are met. In an alternatively embodiment, the HMI 140 may notify the passenger of this assisted lane change prior to actually performing the lane change. For example, the output devices 144 of the HMI 140 may include a display that visually indicates an upcoming assisted lane change, along with an accompanying audio signal. The HMI 140 may display the lane change parameter which is responsible for triggering the assisted lane change, e.g., to avoid driving behind a truck.

Further, the ECU 100 may request a confirmation from the passenger prior to executing the assisted lane change, i.e., between steps 430 and 440 in the flowchart of FIG. 4. Specifically, the ECU 100 obtains permission from the passenger through the HMI 140 prior to performing the assisted lane change.

The above embodiments are described with respect to a leading vehicle 2 directly in front of the subject vehicle 1. However, the present disclosure is also applicable to an adjacent vehicle which is adjacent to the subject vehicle 1, i.e., in an adjacent lane. In this case, the second user input should define parameters with respect to the adjacent vehicle. For example, if the passenger is not comfortable with driving next to a large truck, the second user input may define "large truck" with respect to an adjacent vehicle, indicating that when a large truck is adjacent, an assisted lane change should be performed to move one lane further away from the large truck.

The present disclosure includes implementation as a vehicle controller, which is a processor that includes a CPU and a memory. The vehicle controller is programmed to execute the control processes described with respect to the above described embodiments.

The invention claimed is:

1. A vehicle system, comprising:
a driving condition sensor mounted in a subject vehicle, the driving condition sensor detecting a driving condition related to the subject vehicle;
a human-machine interface mounted in the subject vehicle, the human-machine interface configured to receive, from a user, a user preference input indicating a lane change parameter corresponding to the driving condition;
a processor coupled to the driving condition sensor and the human-machine interface;
a powertrain system configured to control powertrain of the subject vehicle; and
a steering system configured to control steering of the subject vehicle, wherein
the processor is programmed to
receive the user preference input from the human-machine interface,
determine the driving condition from the driving condition sensor, and
determine whether the assisted lane change should be performed based on the driving condition and the lane change parameter, and
control the powertrain system and the steering system to perform the assisted lane change upon determining that the assisted lane change should be performed, wherein
the driving condition sensor includes a vehicle type sensor that detects a vehicle type of a leading vehicle directly ahead of the subject vehicle as the driving condition,
the user preference input includes a list of vehicle types as the lane change parameter, and
the processor is programmed to determine whether the assisted lane change should be performed based on whether vehicle type of the leading vehicle is in the list of vehicle types.

2. The vehicle system of claim 1, wherein
the human-machine interface is configured to notify a passenger of the subject vehicle, and
the processor is programmed to, upon determining that the assisted lane change should be performed, notify the passenger and obtain permission from the passenger through the human-machine interface prior to performing the assisted lane change.

3. The vehicle system of claim 1, wherein the assisted lane change is automatically performed by the processor upon determining that the assisted lane change should be performed.

4. The vehicle system of claim 1, wherein the driving condition sensor includes a speed sensor that detects a vehicle speed of a leading vehicle ahead of the subject vehicle as the driving condition, and the user preference input includes a speed parameter as the lane change parameter.

5. The vehicle system of claim 4, wherein the processor is programmed to determine whether the assisted lane change should be performed based by comparing the detected vehicle speed with the speed parameter.

6. The vehicle system of claim 1, wherein the driving condition sensor includes a road sensor that detects a road type of a road on which the subject vehicle is traveling, and the user preference input includes a road parameter as the lane change parameter.

7. The vehicle system of claim 6, wherein the processor is programmed to determine whether the assisted lane change should be performed based by comparing the detected road type with the road parameter.

8. The vehicle system of claim 1, wherein the lane change parameter includes a trigger parameter and an exception parameter, and the processor is programmed to determine that the assisted lane change should be performed when the trigger parameter matches the driving condition and the exception parameter does not match the driving condition.

9. A vehicle controller, comprising:
a central processing unit coupled to a driving condition sensor and a human-machine interface, the driving condition sensor and the human-machine interface being mounted in a subject vehicle; and
a memory coupled to the central processing unit, wherein the central processing unit is programmed to
receive, from a user through the human-machine interface, a user preference input indicating a lane change parameter,
determine, using the driving condition sensor, a driving condition related to the subject vehicle, the driving condition corresponding to the lane change parameter,
determine whether the assisted lane change should be performed based on the driving condition and the lane change parameter, and
controlling a powertrain system and a steering system to perform the assisted lane change upon determining that the assisted lane change should be performed, wherein
the driving condition sensor includes a vehicle type sensor that detects a vehicle type of a leading vehicle directly ahead of the subject vehicle as the driving condition,
the user preference input includes a list of vehicle types as the lane change parameter, and
the central processing unit is programmed to determine whether the assisted lane change should be performed based on whether vehicle type of the leading vehicle is in the list of vehicle types.

10. The vehicle controller of claim 9, wherein the human-machine interface is configured to notify a passenger of the subject vehicle, and the central processing unit is programmed to, upon determining that the assisted lane change should be performed, notify the passenger and obtain permission from the passenger through the human-machine interface prior to performing the assisted lane change.

11. The vehicle controller of claim 9, wherein the assisted lane change is automatically performed by the central processing unit upon determining that the assisted lane change should be performed.

12. The vehicle controller of claim 9, wherein the driving condition sensor includes a speed sensor that detects a vehicle speed of a leading vehicle ahead of the subject vehicle as the driving condition, and the user preference input includes a speed parameter as the lane change parameter.

13. The vehicle controller of claim 12, wherein the central processing unit is programmed to determine whether the assisted lane change should be performed based by comparing the detected vehicle speed with the speed parameter.

14. The vehicle controller of claim 9, wherein the driving condition sensor includes a road sensor that detects a road type of a road on which the subject vehicle is traveling, and the user preference input includes a road parameter as the lane change parameter.

15. The vehicle controller of claim 14, wherein the central processing unit is programmed to determine whether the assisted lane change should be performed based by comparing the detected road type with the road parameter.

16. The vehicle controller of claim 9, wherein the lane change parameter includes a trigger parameter and an exception parameter, and the central processing unit is programmed to determine that the assisted lane change should be performed when the trigger parameter matches the driving condition and the exception parameter does not match the driving condition.

* * * * *